United States Patent
Huang

(10) Patent No.: US 8,333,099 B2
(45) Date of Patent: Dec. 18, 2012

(54) METHOD FOR MAKING A TUBE OF A TELESCOPIC DEVICE

(76) Inventor: Han-Ching Huang, Xianxi Township, Changhua County (TW)

( * ) Notice: Subject to any disclaimer, the term of this patent is extended or adjusted under 35 U.S.C. 154(b) by 448 days.

(21) Appl. No.: 12/643,702

(22) Filed: Dec. 21, 2009

(65) Prior Publication Data

US 2011/0146368 A1 Jun. 23, 2011

(51) Int. Cl.
*B21D 15/00* (2006.01)
(52) U.S. Cl. .................................................. 72/370.19
(58) Field of Classification Search ............ 72/190–192, 72/370.19, 370.2
See application file for complete search history.

(56) References Cited

U.S. PATENT DOCUMENTS

| 794,089 | A | * | 7/1905 | Rainforth | 72/105 |
| 4,514,997 | A | * | 5/1985 | Zifferer | 72/68 |
| 4,852,380 | A | * | 8/1989 | Haldric et al. | 72/402 |
| 6,073,473 | A | * | 6/2000 | Ziemek | 72/78 |
| 6,550,300 | B2 | * | 4/2003 | Hoffmann et al. | 72/78 |
| 6,705,148 | B1 | * | 3/2004 | McCorry et al. | 72/370.1 |
| 7,950,153 | B2 | * | 5/2011 | Dohmann | 29/897.2 |

\* cited by examiner

*Primary Examiner* — Faye Francis

(57) ABSTRACT

Disclosed is a method for making a tube for a telescopic device. The method includes the step of cutting a section from tubular raw material to provide a semi-product of the tube with a desired value of length, the step of pressing the wall of the semi-product of the tube for a first time to make cavities on an external side of the wall of the semi-product of the tube, and the step of pressing the wall of the semi-product of the tube for a second time to deepen the cavities so that the tube is made with a desired depth.

3 Claims, 9 Drawing Sheets

METHOD FOR MAKING A TUBE OF A TELESCOPIC DEVICE

BACKGROUND OF INVENTION

1. Field of Invention

The present invention relates to a telescopic device for supporting goods in a container and, more particularly, to a method for making a tube of such a telescopic device.

2. Related Prior Art

Referring to FIG. 1, a conventional telescopic device 13 is used to support goods 11 within a container 10 carried on a tractor 12. Two opposite ends of the telescopic device 13 are firmly abutted against two opposite walls of the container 10. The telescopic device 13 is located against the goods 11. Thus, the goods 11 are kept in position while the tractor 12 is driven on the road.

Referring to FIG. 2, the conventional telescopic device 13 includes an internal tube 21 and an external tube 22. A pad is attached to an end of the internal tube 21. Another pad is attached to an end of the external tube 22. Another end of the internal tube 21 is inserted in another end of the external tube 22. Recessed portions 23 are defined in an external side of the internal tube 21 to receive teeth 31 of a toothed wheel of a maneuvering unit 30 provided on the external tube 22. Thus, an effective length of the conventional telescopic device 13 is retained at a desired value while the pads are abutted against two opposite walls of a container for example. Hence, the telescopic device 13 can position the goods 11. More details of the conventional telescopic device 13 can be found in Taiwanese Utility Mold M293988 issued to the applicant of the present application.

More conventional telescopic devices can be found in Taiwanese Invention Patent Nos. 553332, 560588, 568202 and Taiwanese Utility Models M274466 and M358697. Problems are however encountered during the use of the conventional telescopic devices.

The recessed portions in the internal tube of the conventional telescopic device disclosed in Taiwanese Utility Model M293988 or some others of the conventional telescopic devices are cavities. Referring to FIG. 3, the depth of the recessed portions 23 might be too shallow to hold the teeth 31 firmly. The teeth 31 might be removed from the recessed portions 23 due to vibration during the driving of the tractor 12. In such as case, the effective length of the conventional telescopic device 13 would be reduced. Hence, the pads would not be abutted against the walls of the container 12. Hence, the conventional telescopic device 13 would be dropped from the walls of the container 12, thus failing to support the goods 11.

It is however difficult to make deep cavities in the internal tube 21 by one-step punching without breaking the internal tube 21. This is partly due to a large force for such one-step punching and limited thickness of the internal tube 21.

In the other conventional telescopic devices, apertures are made in the internal tube. The apertures are located close to one another and made through the entire thickness of the internal tube. The strength of the internal tube is inevitably jeopardized.

The present invention is therefore intended to obviate or at least alleviate the problems encountered in prior art.

SUMMARY OF INVENTION

It is the primary objective of the present invention to provide a method for making a reliable tube for use in a telescopic device.

To achieve the foregoing objective, in the method according to the present invention method includes the step of cutting a section from tubular raw material to provide a semi-product of the tube with a desired value of length, the step of pressing the wall of the semi-product of the tube for a first time to make cavities on an external side of the wall of the semi-product of the tube, and the step of pressing the wall of the semi-product of the tube for a second time to deepen the cavities so that the tube is made with a desired depth.

Other objectives, advantages and features of the present invention will become apparent from the following description referring to the attached drawings.

BRIEF DESCRIPTION OF DRAWINGS

The present invention will be described via detailed illustration of the preferred embodiment versus the prior art referring to the attached drawings where.

DETAILED DESCRIPTION OF PREFERRED EMBODIMENT

Figure 1:
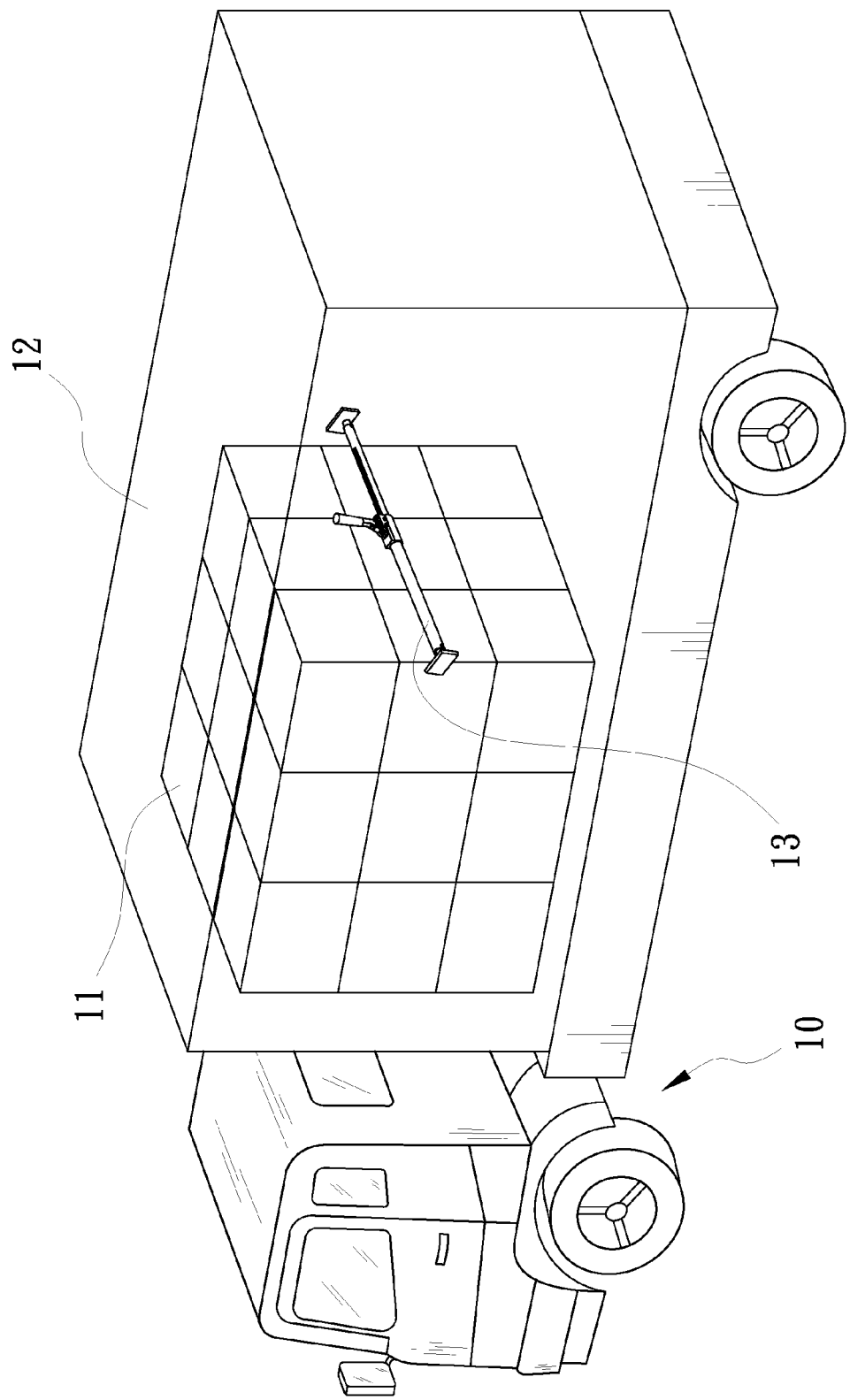
FIG. 1 is a perspective view of a conventional telescopic device used to support goods within a container carried on a tractor.
Figure 2:
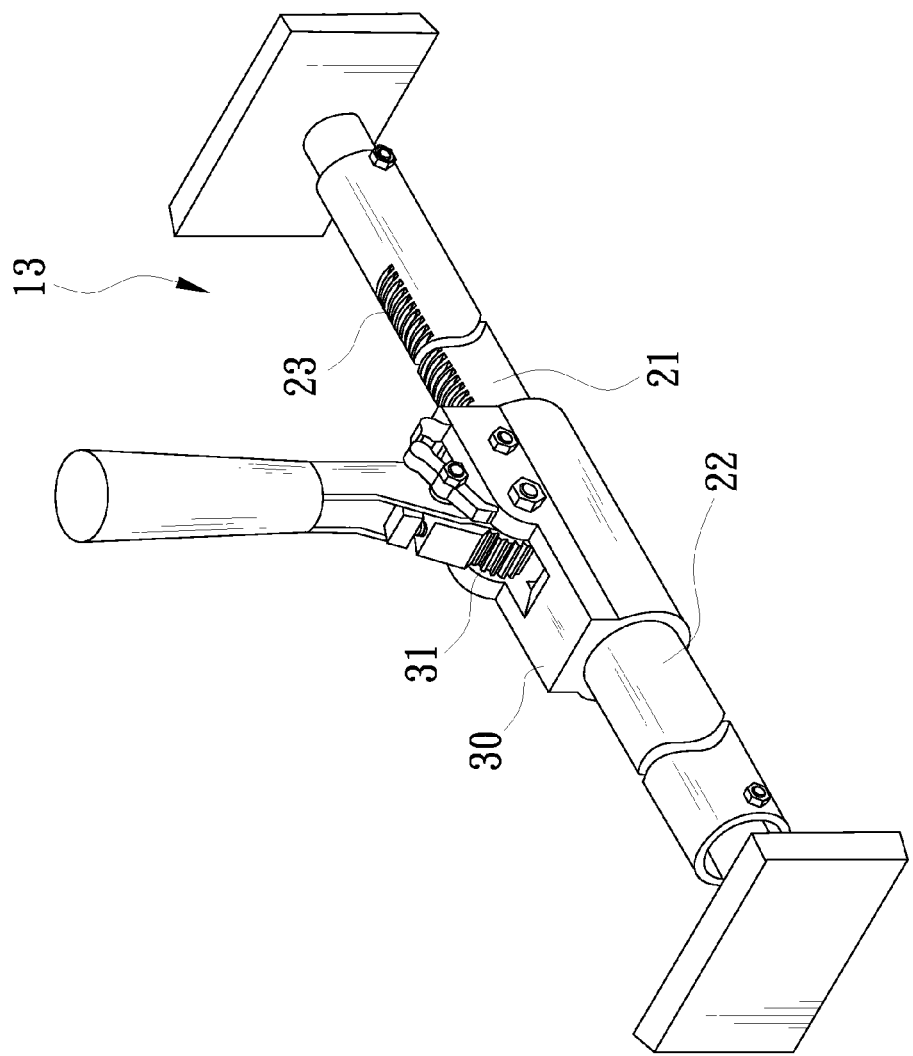
FIG. 2 is an enlarged view of the conventional telescopic device shown in FIG. 1.
Figure 3:
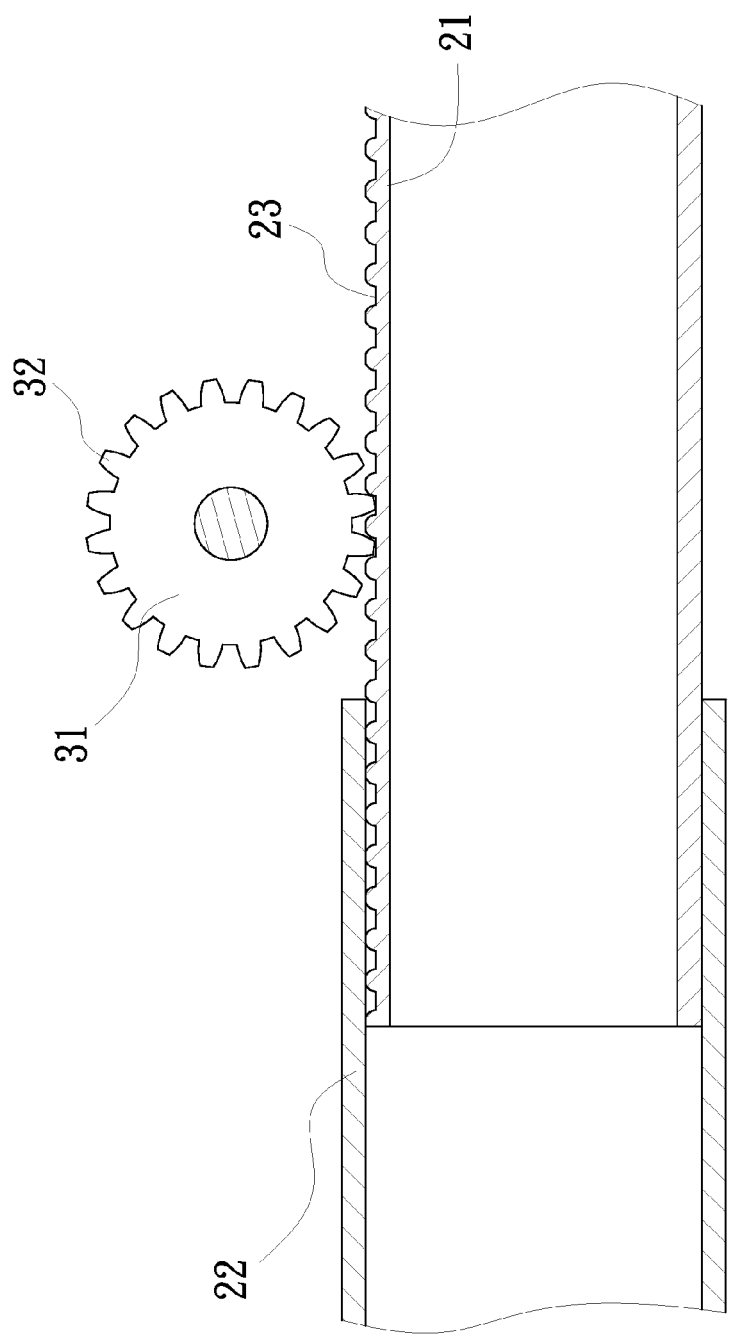
FIG. 3 is a cross-sectional view of the conventional telescopic device shown in FIG. 1.
Figure 4:
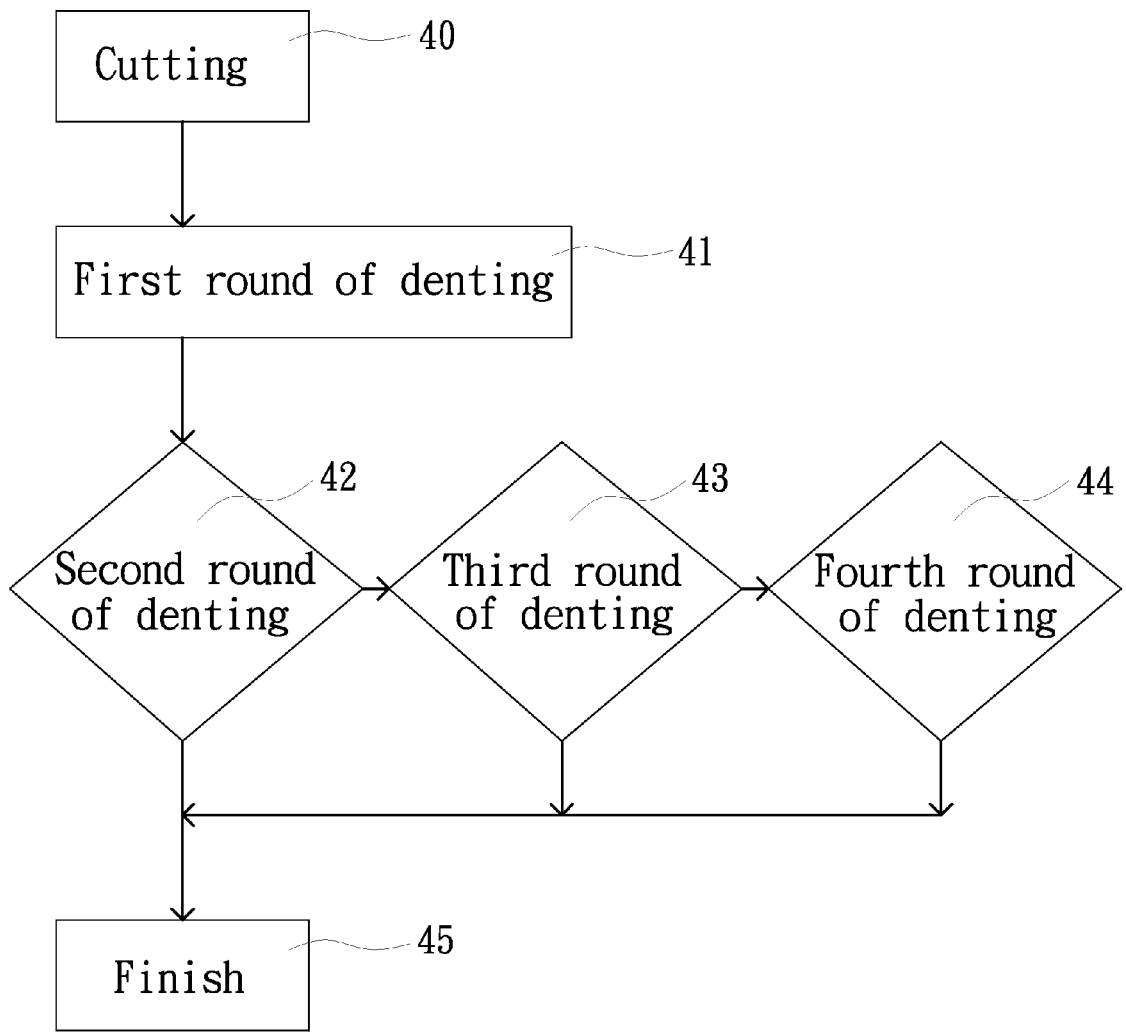
FIG. 4 is a flow chart of a method for making a reliable tube for use in a telescopic device according to the preferred embodiment of the present invention.

Referring to FIG. 4, there is shown a method for making a reliable tube B for insertion in another tube of a telescopic device according to the preferred embodiment of the present invention. At 40, a section is cut from long tubular raw material to provide a semi-product of the tube B with a desired value of length.

Figure 5:
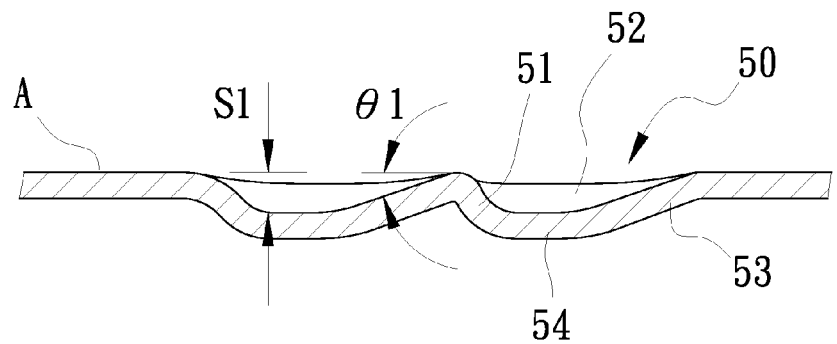
FIG. 5 is a cross-sectional view of a tube after a first pressing step in the method shown in FIG. 4.
Figure 8:
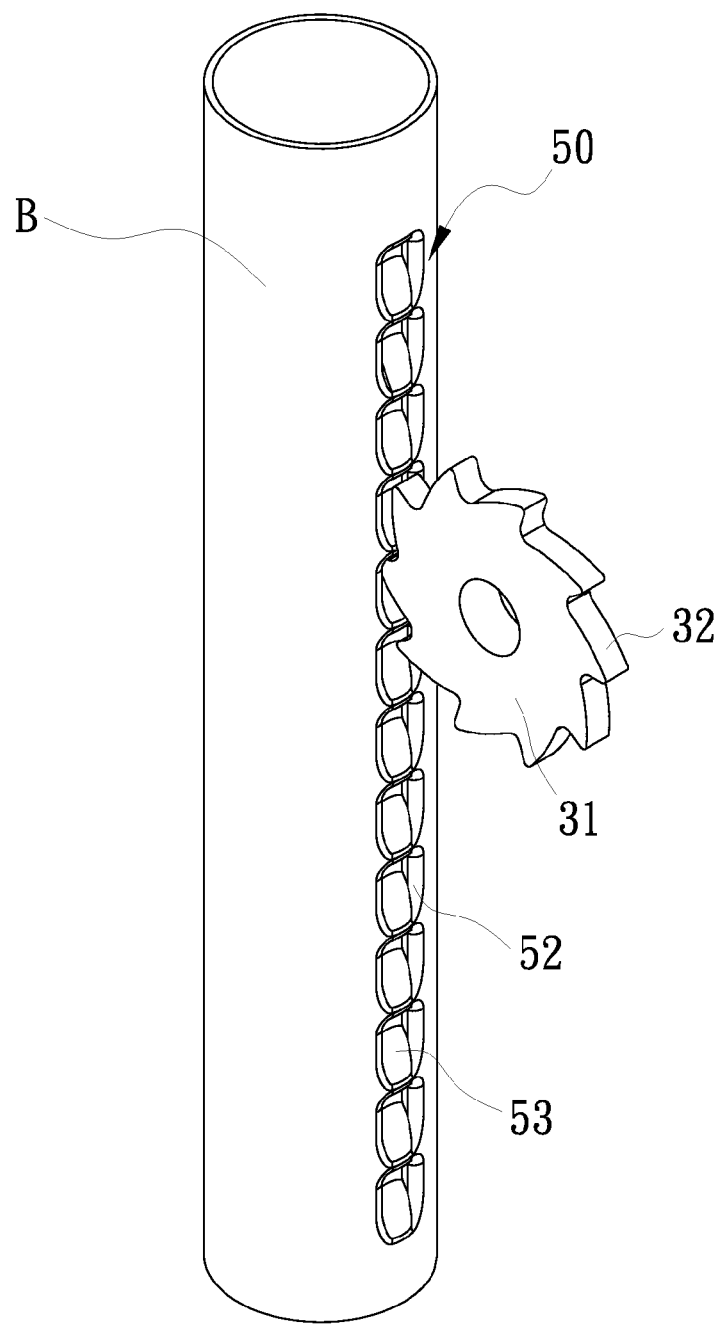
FIG. 8 is a perspective view of a ratcheted wheel of the telescopic device engaged with the tube shown in FIG. 7.

At 41, the wall A of the semi-product of the tube B is pressed to make cavities 50 on an external side thereof referring to FIGS. 5 and 8. Each of the cavities 50 is defined by an abutting facet 51, a guiding facet 53, a supporting face 54 and two lateral facets 52. The abutting facet 51 is substantially located opposite to the guiding facet 52. The supporting facet 54 extends between the abutting facet 51 and the guiding facet 53. The facets 51, 53 and 54 extend between the lateral facets 52.

An angle between the abutting facet 51 and the external side of the wall A of the semi-product of the tube B is larger than an angle θ1 between the guiding facet 53 and the external side of the wall A of the semi-product of the tube B. Each of the cavities 50 is made with a depth S1 measured from the supporting facet 54 to the external side of the wall A of the semi-product of the tube B.

Figure 6:
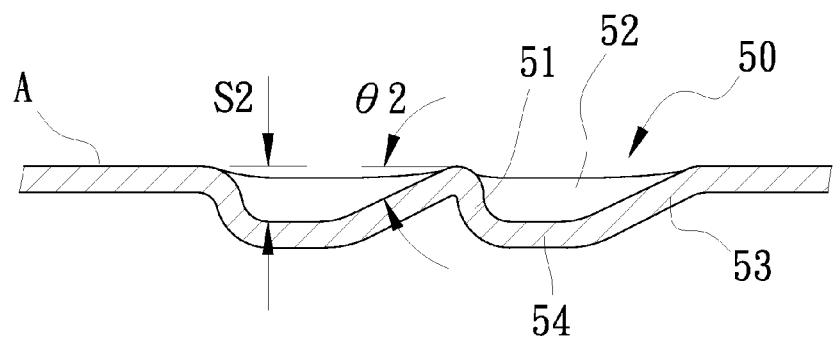
FIG. 6 is a cross-sectional view of the tube shown in FIG. 5 after a second pressing step in the method shown in FIG. 4.

At 42, the wall A of the semi-product of the tube B is pressed again to deepen the cavities 50. Referring to FIGS. 6 and 8, after the second pressing step, the cavities 50 are made with a depth S2 larger than the depth S1. The guiding facet 53 is made with another angle θ2 measured from the external side of the wall A of the semi-product of the tube B. The angle θ2 is larger than the angle θ1.

Figure 7:
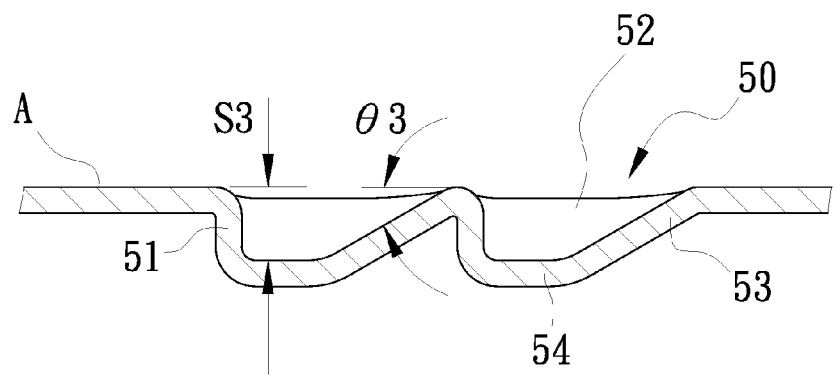
FIG. 7 is a cross-sectional view of the tube shown in FIG. 6 after a third pressing step in the method shown in FIG. 4.

At 43, the wall A of the semi-product of the tube B is pressed for a third time to further deepen the cavities 50. Referring to FIGS. 7 and 8, after the second pressing step, the cavities 50 are made with a depth S3 larger than the depth S2. The guiding facet 53 is made with another angle Θ3 measured from the external side of the wall A of the semi-product of the tube B. The angle θ3 is larger than the angle θ2.

The wall A of the semi-product of the tube B can be pressed for more times to further deepen the cavities 50. Thus, the cavities 50 can be made with a desired depth, and the guiding facet 53 can be made with a desired angle measured from the external side of the wall A of the semi-product of the tube B.

In each of the pressing steps, the pressing can be done via forcing an external mold against the external side of the wall A of the semi-product of the tube B and holding an internal mold against an internal side of the wall A of the semi-product of the tube B. The external mold is made with protrusions in compliance with the cavities 50. The internal mold is made with cavities corresponding to the cavities 50.

The pressing can be done in another manner. An external mold is located around the wall A of the semi-product of the tube B, leaving a gap between an internal side of the external mold and the external side of the wall A of the semi-product of the tube B. An internal mold is located against the internal side of the wall A of the semi-product of the tube B. The internal mold is made with cavities corresponding to the cavities 50. Pressurized liquid can be filled into the gap.

At 45, the tube B is made.

Figure 9:
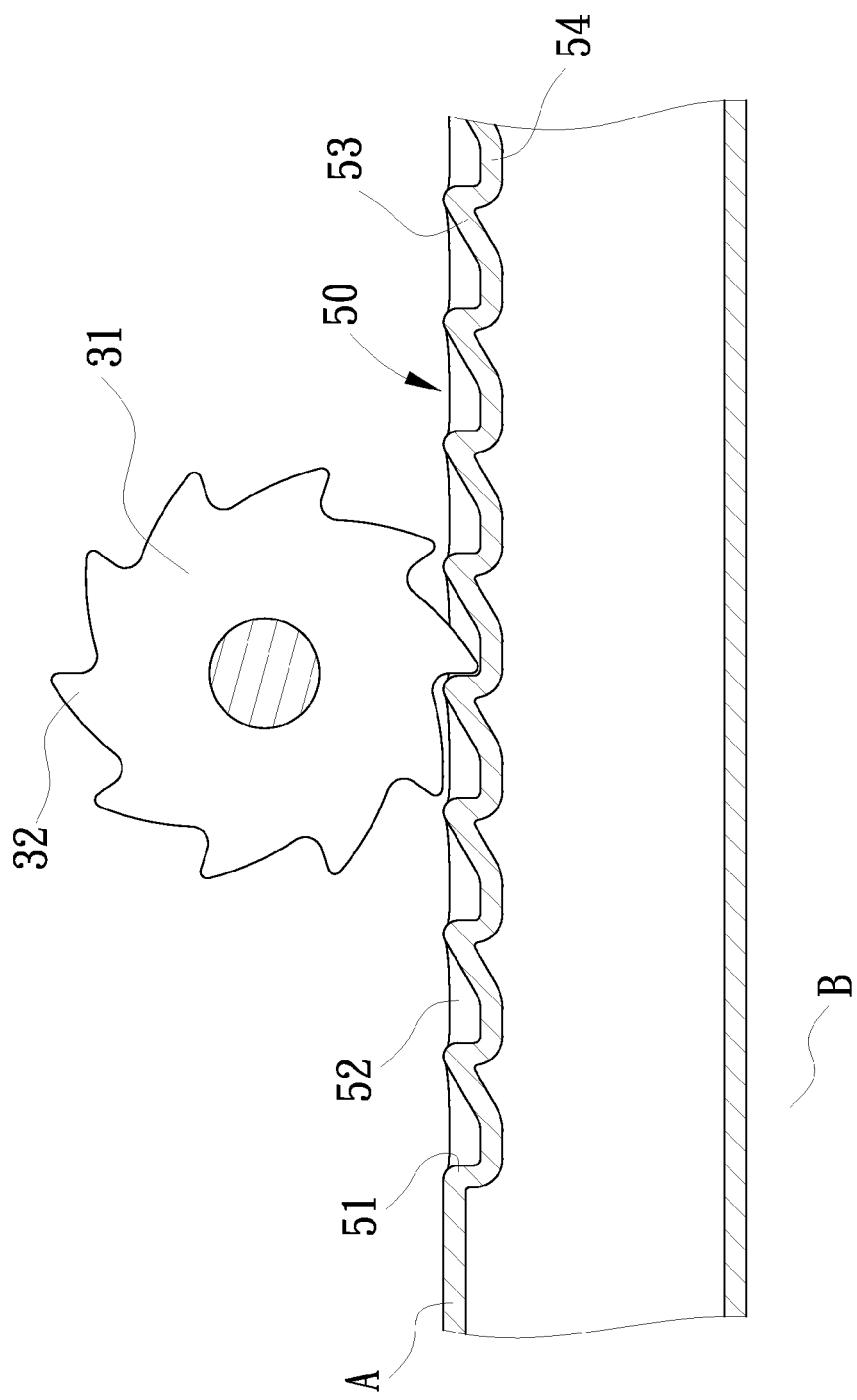
FIG. 9 is a cross-sectional view of the ratcheted wheel and the tube shown in FIG. 8.
Figure 10:
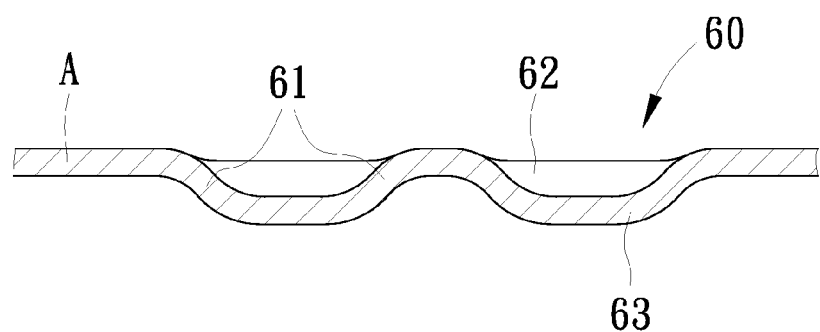
FIG. 10 is a cross-sectional view of another tube after the first pressing step in the method shown in FIG. 4.
Figure 11:
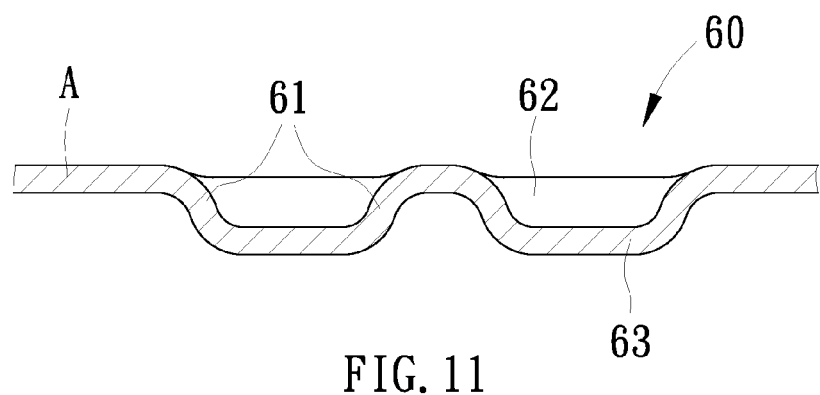
FIG. 11 is a cross-sectional view of the tube shown in FIG. 10 after the second pressing step in the method shown in FIG. 4.
Figure 12:
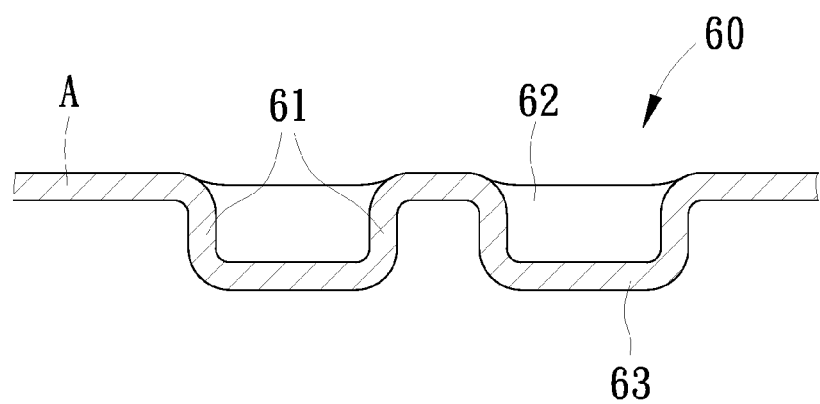
FIG. 12 is a cross-sectional view of the tube shown in FIG. 11 after the third pressing step in the method shown in FIG. 4.
Figure 13:
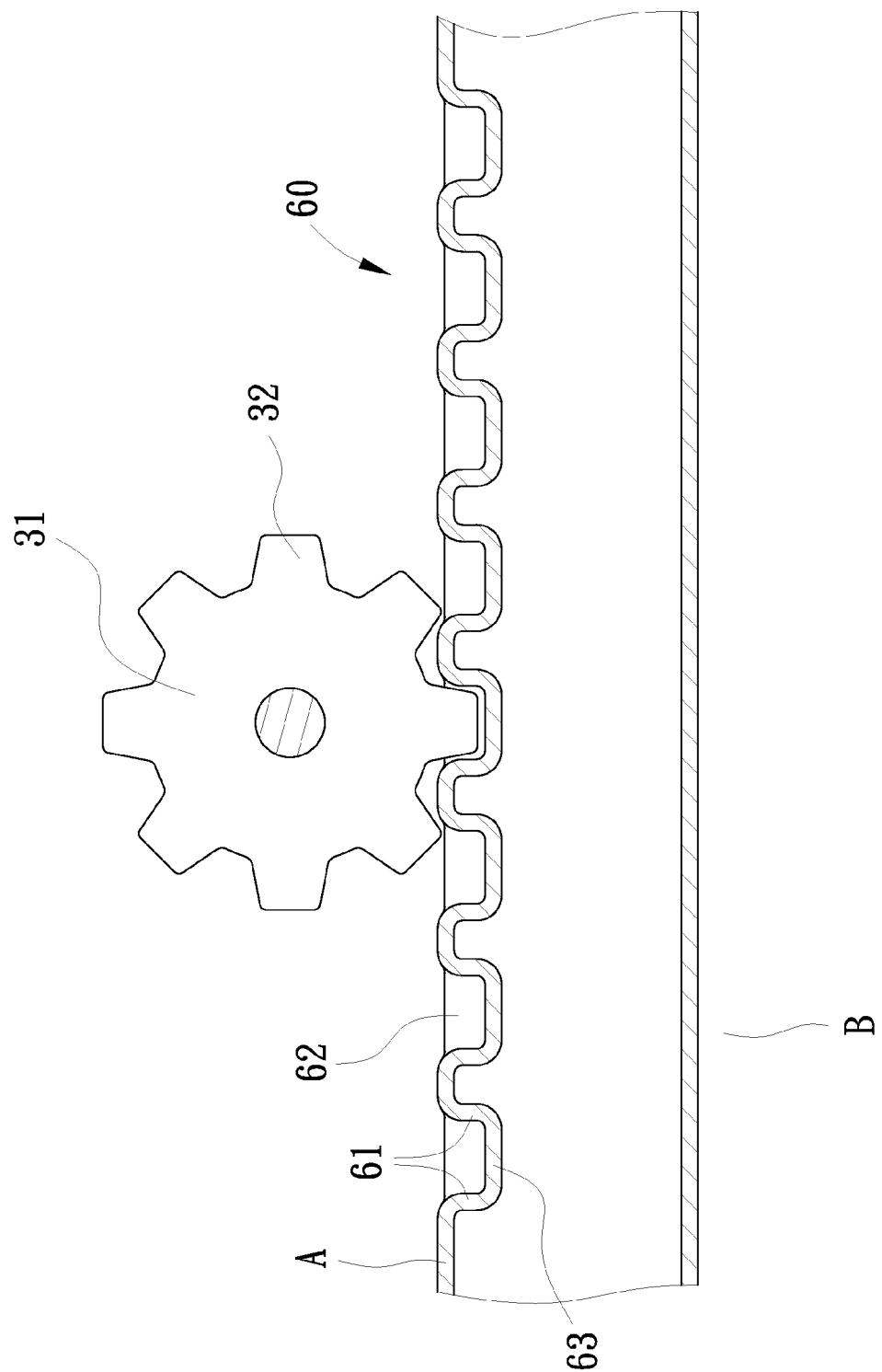
FIG. 13 is a cross-sectional view of a toothed wheel of the telescopic device engaged with the tube shown in FIG. 12.

Referring to FIGS. 8 and 9, there is shown a ratcheted wheel 31 engaged with the tube B. The ratcheted wheel 31 includes ratchets 32 inserted in some of the cavities 50 of the tube B. The engagement of the ratcheted wheel 31 with the tube B is firm since the cavities 50 are deep. The guiding facets 53 enable the ratcheted wheel 31 to roll on the tube B in a direction in the extension of the telescopic device. The abutting facets 51 prevent the ratcheted wheel 31 from rolling on the tube B in an opposite direction.

Referring to FIGS. 10 through 13, there is shown another tube B made in the method according to the preferred embodiment of the present invention. The tube B is made with square cavities 60 compliant to square teeth instead of the cavities 50 compliant to the ratchets 31. Each of the square cavities 60 is defined by two abutting facets 61, a supporting face 63 and two lateral facets 62. The abutting facets 61 are located opposite to each other. The supporting facet 63 extends between the abutting facets 61. The facets 61 and 63 extend between the lateral facets 62.

To make the tube B shown in FIGS. 10 through 13, in each of the pressing steps, the pressing can be done via forcing an external mold against the external side of the wall A of the semi-product of the tube B and holding an internal mold against an internal side of the wall A of the semi-product of the tube B. The external mold is made with square protrusions in compliance with the square cavities 60. The internal mold includes square cavities corresponding to the square cavities 60.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a tube for a telescopic device, the method comprising the steps of:
    providing a semi-product of the tube with a desired value of length by cutting a section from long tubular raw material;
    pressing the wall of the semi-product of the tube for a first time to make cavities on an external side of the wall of the semi-product of the tube; and
    pressing the wall of the semi-product of the tube for a second time to deepen the cavities so that the tube is made with a desired depth, wherein each of the cavities is defined by an abutting facet, a guiding facet located substantially opposite to the abutting facet, a supporting face extending between the abutting facet and the guiding facet, and two lateral facets between which the abutting facet, the guiding facet and the supporting facet extend, wherein an angle between the abutting facet and the external side of the wall of the tube is larger than an angle between the guiding facet and the external side of the wall of the tube.

2. The method according to claim 1, further including the step of pressing the wall of the semi-product of the tube for a third time to further deepen the cavities.

3. The method according to claim 2, further including the step of pressing the wall of the semi-product of the tube for a fourth time to further deepen the cavities.

* * * * *